(12) United States Patent
Spooner et al.

(10) Patent No.: US 11,511,579 B2
(45) Date of Patent: Nov. 29, 2022

(54) TOW BAR ASSEMBLY

(71) Applicant: Rees Operations Pty Ltd, Camden Park (AU)

(72) Inventors: Greg Spooner, Camden Park (AU); Huey Lam, Camden Park (AU); Matthew Reimers, Camden Park (AU)

(73) Assignee: REES OPERATIONS PTY LTD, Camden Park (AU)

( * ) Notice: Subject to any disclaimer, the term of this patent is extended or adjusted under 35 U.S.C. 154(b) by 568 days.

(21) Appl. No.: 16/277,333

(22) Filed: Feb. 15, 2019

(65) Prior Publication Data

US 2019/0255899 A1    Aug. 22, 2019

(30) Foreign Application Priority Data

Feb. 16, 2018    (AU) .......................... AU2018900491

(51) Int. Cl.
*B60D 1/48*    (2006.01)
*B60D 1/145*    (2006.01)
*B23K 101/24*    (2006.01)

(52) U.S. Cl.
CPC ............. *B60D 1/485* (2013.01); *B60D 1/145* (2013.01); *B23K 2101/24* (2018.08)

(58) Field of Classification Search
CPC .......... B60D 1/36; B60D 1/145; B60D 1/485; B23K 2101/24
USPC ........................................................ 280/495
See application file for complete search history.

(56) References Cited

U.S. PATENT DOCUMENTS

| | | | | |
|---|---|---|---|---|
| 5,511,813 A * | 4/1996 | Kravitz | .................... | B60D 1/42 280/495 |
| 5,620,198 A * | 4/1997 | Borchers | .................. | B60D 1/52 280/491.5 |
| 6,173,984 B1 * | 1/2001 | Kay | ........................ | B60D 1/145 280/491.5 |
| 6,348,112 B1 * | 2/2002 | Hildreth | .................... | B60D 1/00 148/649 |
| 6,585,280 B1 * | 7/2003 | Wiers | ........................ | B60D 1/18 280/468 |
| 2004/0021295 A1 * | 2/2004 | Westerdale | ............ | B60D 1/485 280/495 |
| 2006/0186637 A1 * | 8/2006 | Scruggs | ................. | B60D 1/485 280/495 |

(Continued)

FOREIGN PATENT DOCUMENTS

| | | | | |
|---|---|---|---|---|
| DE | 102013008334 A1 * | 11/2014 | ............. | B60D 1/485 |
| EP | 2508367 A1 * | 10/2012 | ............. | B60D 1/485 |
| WO | WO-2009108155 A1 * | 9/2009 | ............... | B60D 1/02 |

*Primary Examiner* — Minnah L Seoh
*Assistant Examiner* — Maurice L Williams
(74) *Attorney, Agent, or Firm* — Gregory L. Ozga; Warn Partners, P.C.

(57) ABSTRACT

A tow bar assembly for mounting to a vehicle, the tow bar assembly including a main beam configured to support a hitch receiver, the main beam comprising a bracket engaging portion at or near each end, a pair of brackets configured to securely mount to the vehicle, each bracket including a beam engaging portion, and a pair of fastening means for securing respective brackets at or near respective ends of the main beam, wherein each bracket and its respective beam bar engaging portion is configured to cooperatively interengage with a respective bracket engaging portion so as to locate and orient the bracket with respect to the main beam.

5 Claims, 5 Drawing Sheets

(56) References Cited

U.S. PATENT DOCUMENTS

| | | | |
|---|---|---|---|
| 2007/0063482 A1* | 3/2007 | Binkowski | B60D 1/485 280/495 |
| 2011/0109063 A1* | 5/2011 | Fudala | B60D 1/485 280/497 |
| 2020/0016946 A1* | 1/2020 | Fabiano | B60D 1/485 |

* cited by examiner

TOW BAR ASSEMBLY

CROSS-REFERENCE TO RELATED APPLICATIONS

The present application claims priority to Australian Patent Application No. 2018900491, filed Feb. 16, 2018, the contents of which are incorporated herein by reference in its entirety.

TECHNICAL FIELD

The present invention relates to a tow bar assembly for a vehicle.

BACKGROUND

Many vehicles are equipped with tow bars for the purpose of towing trailers or caravans via a towing hitch. The tow bar may also be used as an attachment point for other cargo accessories such as bike racks or cargo boxes.

Tow bars typically comprise a fully welded assembly include a hitch receiver or hitch tube with an opening configured to receive a towing hitch or other cargo accessory. The hitch receiver is mounted on or in connection with a main bar featuring connection means in the form of connection brackets which are specifically configured to mount the main bar to structural members provided on the vehicle, such that a load path is provided between the hitch receiver and the vehicle structural members through the main bar and connections means.

Manufacture of a typical welded tow bar assembly requires substantial jigging to ensure that the various components making up the assembly are correctly positioned prior to welding.

Many tow bars are provided as vehicle specific after-market kits, which are installed on a vehicle after manufacture. These kits comprise the fully welded tow bar assembly and fasteners necessary to mount the tow bar to the vehicle. The fully welded assembly is bulky, which impacts on logistics, warehousing and delivery to market costs.

Tow bar assemblies that mount onto structural members of vehicles in some cases produce load paths that rely totally, or to a large extent, on bolts. In such cases, higher towing loads require a larger number of bolts, or stronger bolts.

A further issue that arises with after-market kits is the need to design a kit that makes assembly robust to inadvertent errors and the need to design a kit that is easy to assemble correctly.

It is against this background, and the problems and difficulties presented therein, that the present invention has been developed.

SUMMARY

According to a first aspect, there is provided a tow bar assembly for mounting to a vehicle, the tow bar assembly including a main beam configured to support a hitch receiver, the main beam comprising a bracket engaging portion at or near each end, a pair of brackets configured to securely mount to the vehicle, each bracket including a beam engaging portion, and a pair of fastening means for securing respective brackets at or near respective ends of the main beam, wherein each bracket and its respective beam bar engaging portion is configured to cooperatively interengage with a respective bracket engaging portion so as to locate and orient the bracket with respect to the main beam.

In one form, the tow bar assembly further includes a flange at or near each end of the main beam, and wherein each of the brackets are secured to the main beam via the flanges.

In one form, each bracket engaging portion is in the form of a projection extending from the end of the main beam, such that the beam engaging portion of each of the brackets locates over the projection.

In one form, each bracket engaging portion is in the form of a plurality of spaced apart projections extending from the end of the main beam, such that the beam engaging portion of each of the brackets locates over the projections.

In one form, each bracket includes an internal portion, wherein in use, the internal portion nests within the projections.

In one form, each beam engaging portion is in the form of a pair of spaced-apart beam ends and, wherein each bracket includes an internal portion, wherein in use, the internal portion nests within the beam ends.

In one form, each flange includes a central portion that nests within the beam ends.

In one form, each flange is welded to the main beam.

In one form, each fastening means includes at least one nut and bolt pair.

In one form, each bracket and its respective beam engaging portion is configured to cooperatively interengage with a respective bracket engaging portion in one orientation only.

According to a second aspect, there is provided a tow bar assembly for mounting to a vehicle, the tow bar assembly including a main beam configured to support a hitch receiver, the main beam comprising a flange and a bracket engaging portion in the form of a projection at each end, a pair of brackets configured to securely mount to the vehicle, each bracket including a beam engaging portion, and a pair of fastening means for securing respective brackets to a respective flange, wherein each bracket and its respective beam engaging portion is configured to cooperatively locate over and interengage with a respective bracket engaging projection so as to locate and orient the bracket with respect to the main beam, and wherein each bracket is secured to the main beam via a respective flange.

According to a third aspect, there is provided a method of assembling the tow bar assembly of as described above, the method including locating and orienting each of the brackets with respect to the main beam, such that their respective bracket and beam engaging portions interengage, and securing each of the brackets to the main beam using the fastening means.

According to a fourth aspect, there is provide a method of manufacturing a tow bar assembly, the method including the steps of producing a main beam, having first locating features, producing a hitch receiver, having second locating features, the second locating features complementary to the first locating features, assembling the hitch receiver and main beam such that the first and second locating features interengage, and welding the hitch receiver and the main beam together without the use of external jigging fixing the alignment of the hitch receiver and the main beam.

BRIEF DESCRIPTION OF DRAWINGS

Embodiments of the present invention will be discussed with reference to the accompanying drawings wherein.

DESCRIPTION OF EMBODIMENTS

Figure 1:
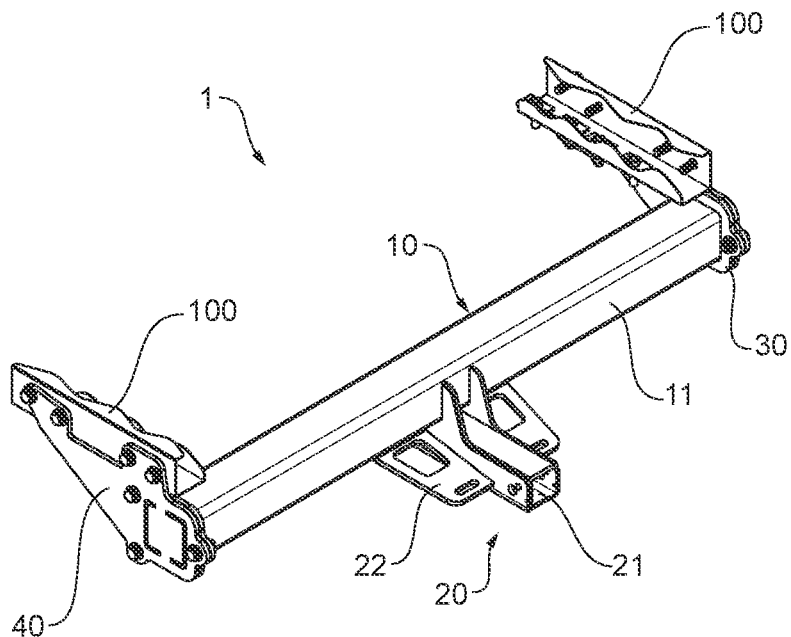
FIG. 1 is a perspective view of a tow bar assembly, according to an embodiment mounted to chassis rails of a vehicle.
Figure 2:
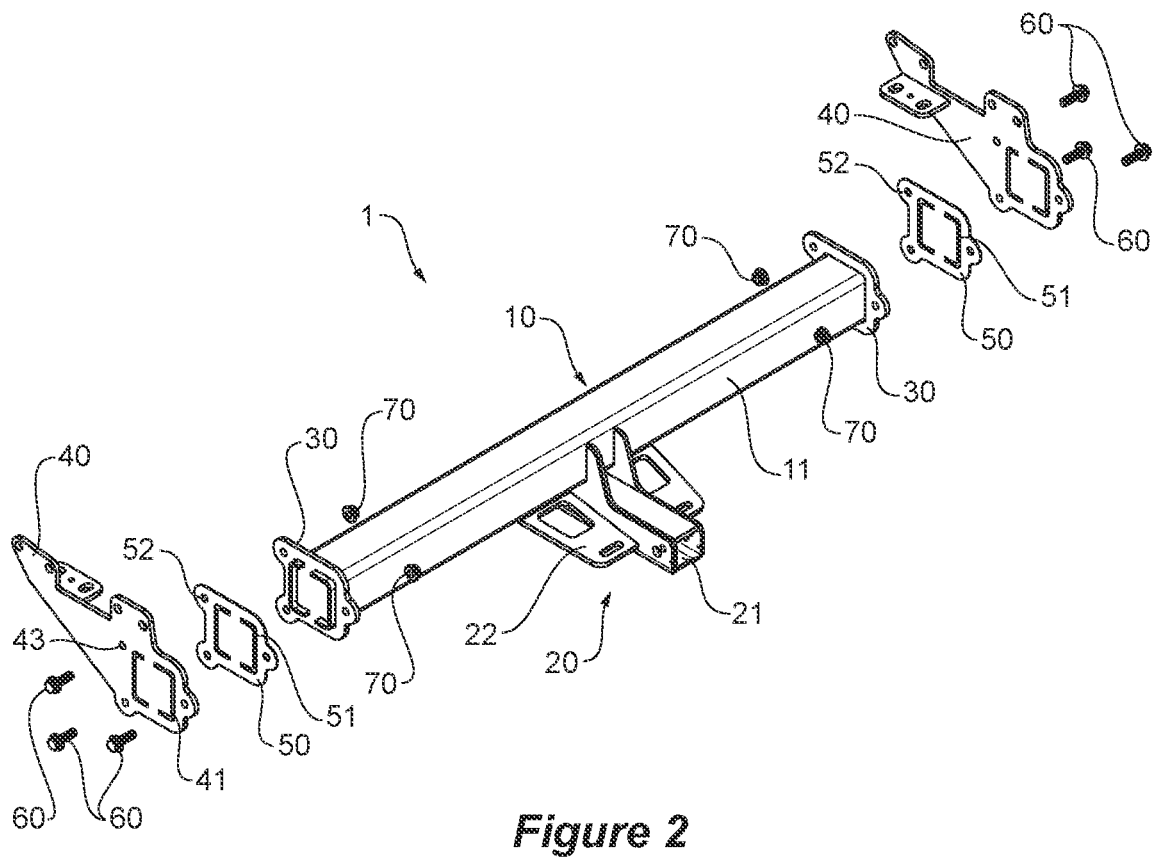
FIG. 2 is an exploded view of the tow bar assembly of FIG. 1.
Figure 3:
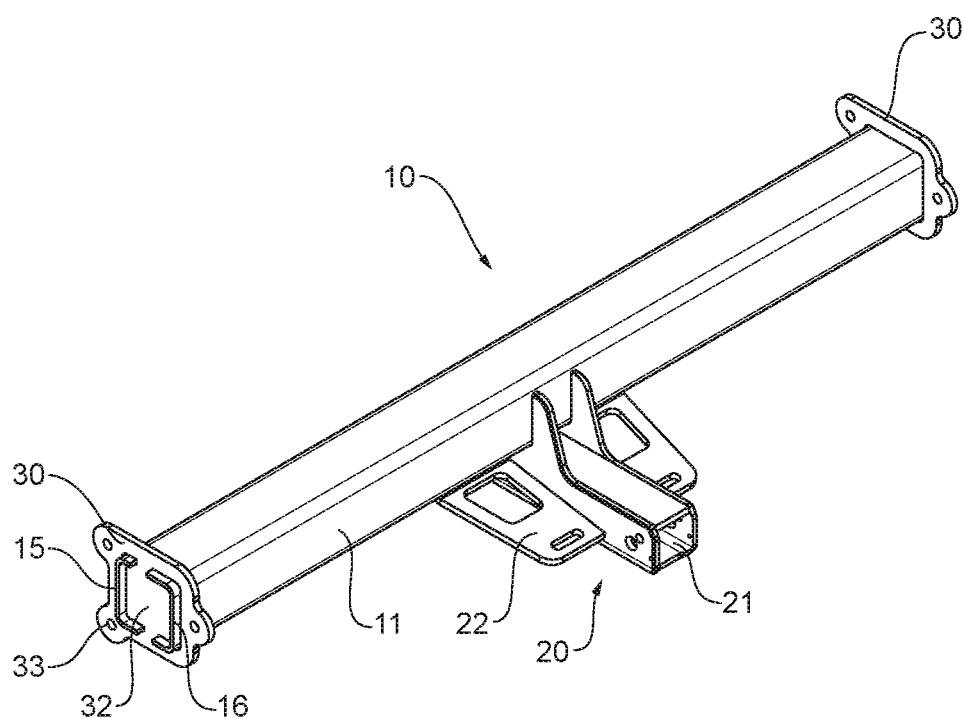
FIG. 3 is a perspective view of a main bar from the tow bar assembly of FIGS. 1 and 2.
Figure 6:
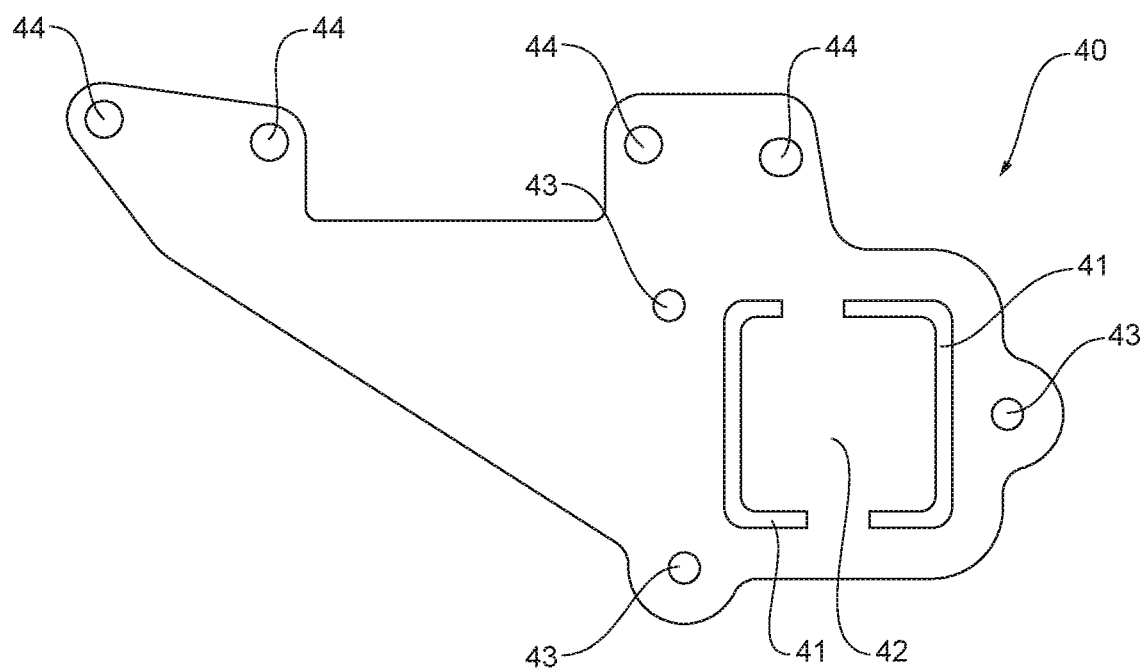
FIG. 6 is a side view of a bracket of the tow bar assembly of FIGS. 1 and 2.

Referring now to FIG. 1, there is shown a perspective view of a tow bar assembly 1, according to an embodiment, mounted to chassis rails 100 of a vehicle. The tow bar assembly 1 as shown in FIGS. 2, 3 and 6 comprises a main bar 10 which is mounted to the chassis rails 100 via brackets 40. In the embodiment shown, each bracket 40 mounts to a respective chassis rail via a number of bolts, the bracket having mounting holes 44 (as best shown in FIG. 6) that align with mounting holes on the chassis rails. While in the embodiment shown, the mounting points for the brackets are the chassis rails from a vehicle, in other applications, the mounting points may be some other structural member or suitable mounting area on the vehicle. It will be appreciated that depending on the type and location of the structural members used as mounting points, the brackets may take on a variety of forms to suit the application.

Figure 7:
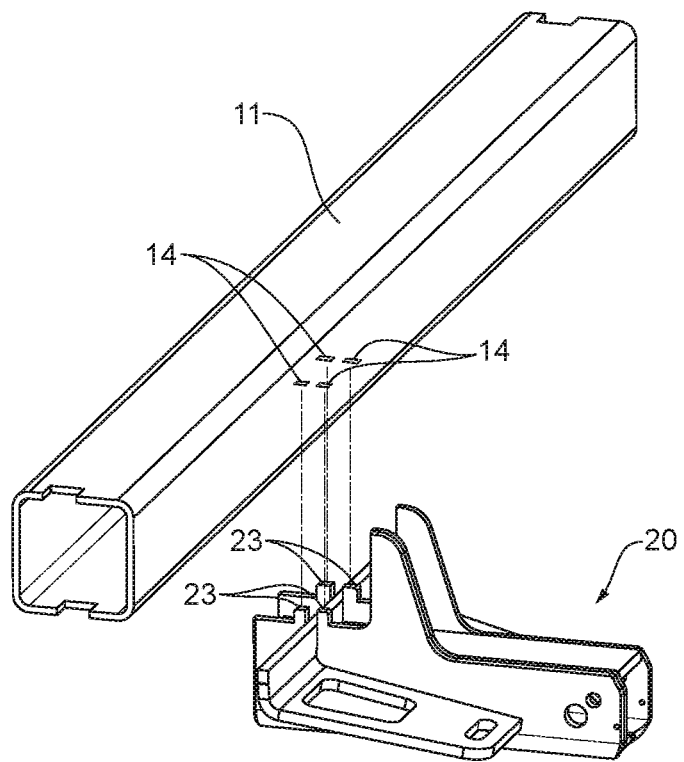
FIG. 7 is an exploded view of the main bar of FIGS. 3 and 4 detailing the relationship between a receiver hitch and a beam from the main bar.
Figure 8:
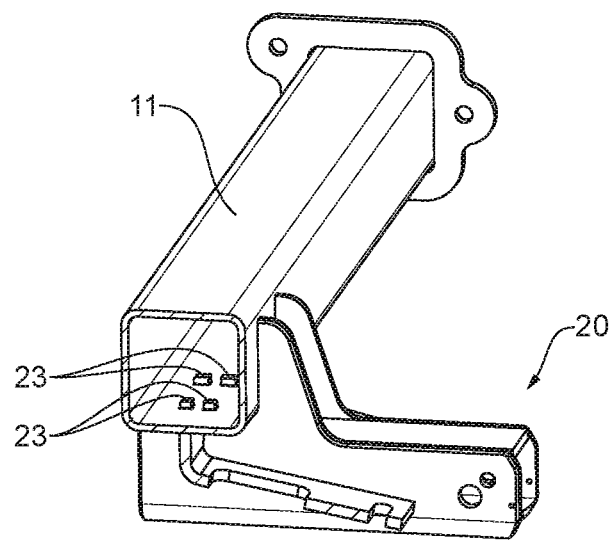
FIG. 8 is a sectional view of the main bar of FIGS. 3 and 4 detailing the relationship between the receiver hitch and the beam.

The main bar 10 (shown in FIGS. 3 and 4) is a fully welded structure comprising a structural beam 11, a hitch receiver 20, and a pair of flanges 30 located at each end of the beam. As detailed in FIGS. 7 and 8, the hitch receiver 20 comprises a hitch receiving tube 21, reinforcing gussets 22 and locating projections 23 for locating the hitch receiver 20 with respect to complimentary cut-outs 14 formed in the beam 11. It will be appreciated that the relationship between the cut outs in the beam and the projections on the hitch receiver means that the hitch receiver and beam are self-jigging, meaning that the parts can be welded together without the need for external jigs to position and hold the parts in place.

Figure 4:
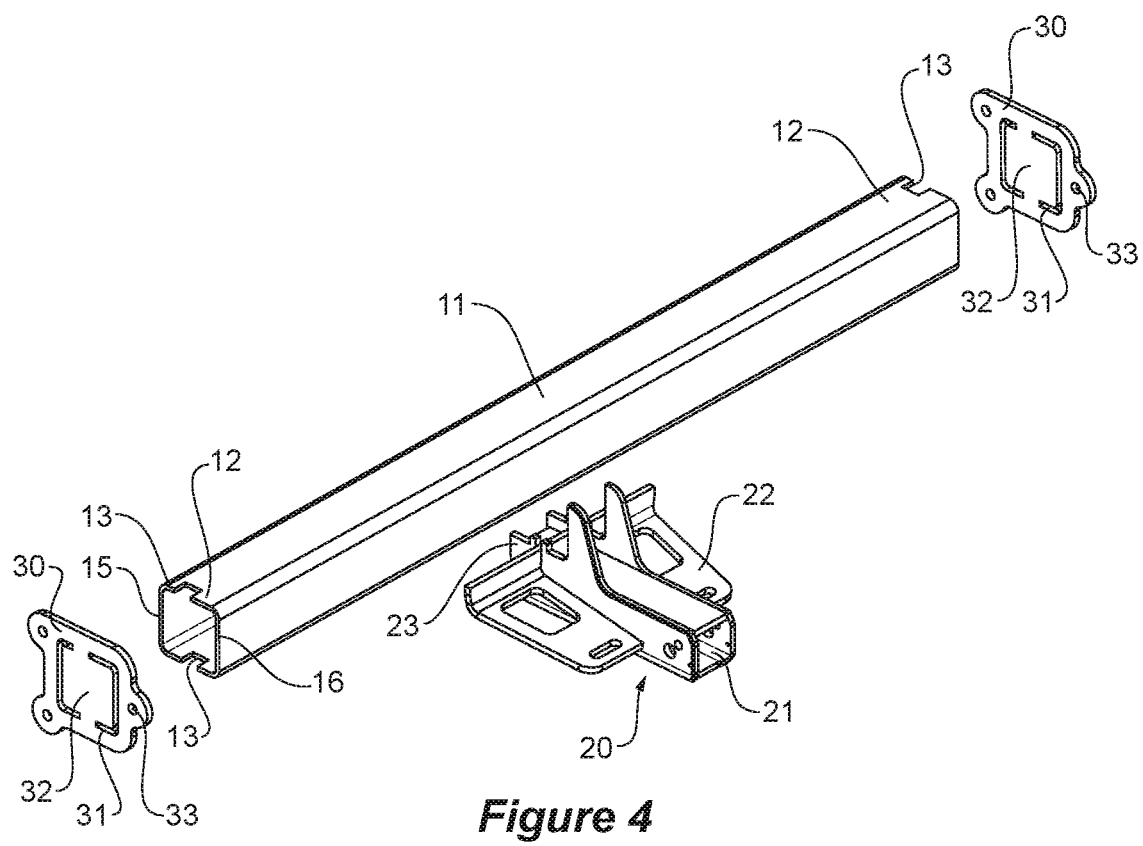
FIG. 4 is an exploded view of the main bar of FIG. 3.
Figure 5:
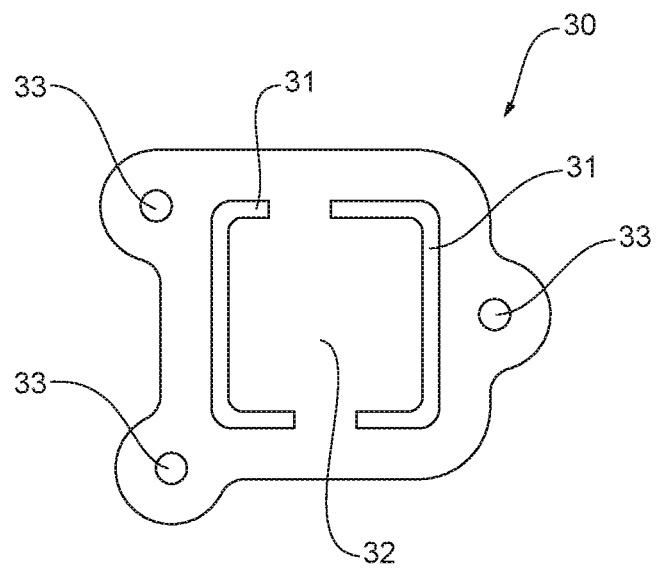
FIG. 5 is a side view of a main bar flange of the tow bar assembly of FIG. 4.

The beam 11 features notches 13 cut in to each of its ends 12, providing an end profile which matches complimentary cut-outs 31 provided in each flange 30. The cut-outs 31 allow each flange 30 to locate over a respective end 12 of the beam 11 and to be slid along the beam 11 until the flange 30 rests against the base of the notches 13 such that it is correctly positioned for welding to the beam 11. As can be seen in FIGS. 3 to 5, the location/pattern of the notches 13 in the beam 11 and the cut-outs 31 in the flanges 30 is non-symmetrical, meaning that the flanges 30 may only be located over the ends of the beam 11 when they are correctly oriented with respect to the beam 11. It will be appreciated that the relationship between the notched ends 12 of the beam 11 and the cut-outs 31 of the flanges 30 means that the flanges 30 and beam 11 are also self-jigging.

As shown in FIG. 3, when the flanges 30 are welded to the beam 11, a central portion 32 of each flange 30 nests within the inside of the beam 11 such that the end 12 of the beam is closed, preventing foreign materials (such as dust and water) from entering the inside of beam 11. The closed beam structure described above and illustrated in FIG. 3 has the advantage that the inside of the bar does not require surface treatment. Lazer cutting of the components facilitates tight tolerancing. In some instances this may allow powder-coat treatment to cover joints effectively.

The flanges 30 and brackets 40, shown in FIGS. 5 and 6, feature complimentary mounting holes 33, 43 configured to receive fasteners in the form of bolts 60 (shown in FIG. 2) which secure the brackets 40 to the flanges 30. As can be seen in FIGS. 2 and 3 the ends 12 of the beam 11 project beyond the flanges 30 to act as bracket engaging portions, which enable each of the brackets 40 to locate over a respective end 12 of the beam 11 prior to being secured to the main bar via a flange 30. The brackets 40 feature complimentary cut-outs 41 that allow each bracket to locate over an end 12 of the beam 11 and to be slid along the beam 11 until the bracket 40 rests against the flange 30. As can also be seen in FIG. 6, the location/pattern of the cut-outs 41 in each bracket is non-symmetrical, meaning that each bracket 40 may only be located over and end 12 of the beam 11 when it is correctly oriented. Each bracket 40 and its respective beam engaging portion is configured to cooperatively interengage so as to locate and orient the bracket with respect to the beam 11. That is, each bracket and its respective beam engaging portion is configured to cooperatively interengage in one orientation only. In this way a "poka-yoke" solution is achieved. That is, the assembly is substantially protected against inadvertent assembly errors.

In addition to providing a means for locating and ensuring correct orientation of the brackets 40 with respect to the main bar 10, the bracket engaging portions at the end 12 of the beam 11 also act to transfer load between the main bar 10 and the bracket 40. The beam 11 terminates in projections in the form of spaced-apart beam ends 15, 16 as is shown most clearly in FIGS. 3 and 4. Each bracket includes an internal portion 42 (as shown in FIG. 6). In use, the internal portion 42 nests within the beam ends 15, 16. This has the effect of ensuring that rotation of the beam 11 will be resisted by the internal portion 42 of the bracket engaging with the beam ends 15 and 16, at least if there is a failure in other load paths (which could be caused by bolt losses for instance).

Load is transferred from the hitch receiver 20 to the chassis rails 100 via two paths, one being through the beam, flange, bolts and bracket (where the bolts 60 act in shear to transfer load between the flange and the bracket) and the other being through the beam and bracket (where the end 12 of the beam 11 bears against the bracket 40).

As shown in FIG. 1 when read with FIGS. 5 and 6, when the brackets 40 are secured to the flanges 30 and the beam 11, an internal portion 42 of each bracket 40 nests within the inside of the beam 11. This assists with load transfer. The beam is strengthened against distortion and twisting by the central portions 32 of the flange 30 and the internal portions 42 of the brackets 40. For the embodiment illustrated in FIGS. 5 and 6, both of the central portions 32 and the internal portions 42 are planar in shape.

By transferring load directly between the beam 11 and bracket 40, the amount of load required to be transferred by the bolts is reduced. This may have the consequence of reducing the number of bolts required to secure the bracket 40 to the flange 30, however at least one bolt or equivalent fastening means would still be relied upon to secure the bracket 40 and flange 30 together during assembly. Once fully assembled onto a vehicle, the cooperative inter-engagement described above potentially acts as a fail-safe in the case that bolts are lost or fail for any reason.

It will be appreciated that while in the embodiment shown the beam 11 has a square cross-sectional area, in alternative embodiments the beam may have other suitable forms. It will also be appreciated, that depending on the vehicle or towing application, that the dimensions of the beam and bracket may vary.

The tow bar may be assembled and secured to a vehicle using the following method.

Each bracket 40 is oriented with respect to the main bar 10 such that its cut-outs 41 align with and locate over a respective notched end 12 of the beam 11, where each bracket 40 is slid along the beam 11 until it abuts a respective flange 30. The bracket 40 and flange 30 are then fastened together using fasteners in the form of bolts 60 and nuts 70, forming a complete tow bar assembly 1. The assembly 1 is then oriented and positioned with respect to the vehicle such that the mounting holes 44 in the brackets 40 align with the mounting holes located on the vehicle chassis rails 100 and the brackets 40 are then fastened to the vehicle.

In instances where there may be tolerancing issues between the mounting points on the vehicle and the tow bar assembly 1, one or more shims 50 may be placed between the flange 30 and the bracket 40. As shown in FIG. 2, the shims 50 features cut-outs 51 shaped to locate over the ends 12 of the beam 11 and mounting holes 52 to accommodate the fasteners connecting the brackets 40 to the flanges 30.

Figure 9:
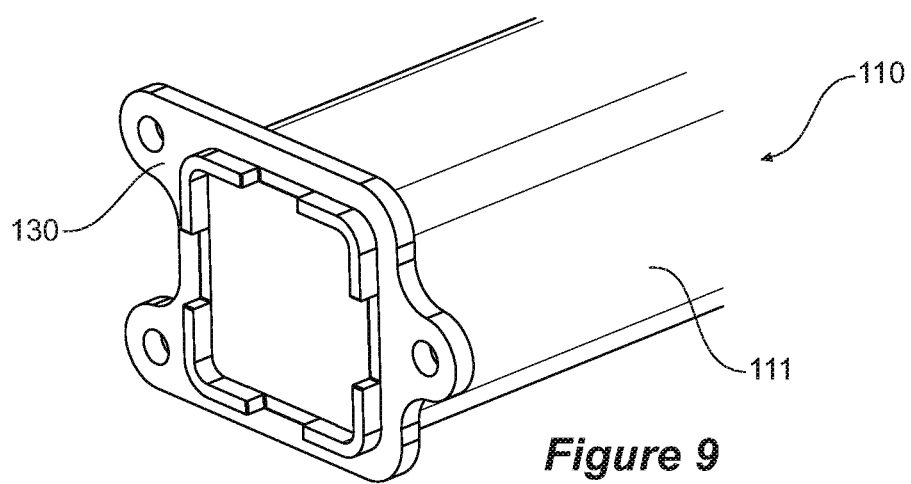
FIG. 9 is a perspective view of an end of a main bar according to an alternative embodiment.
Figure 10:
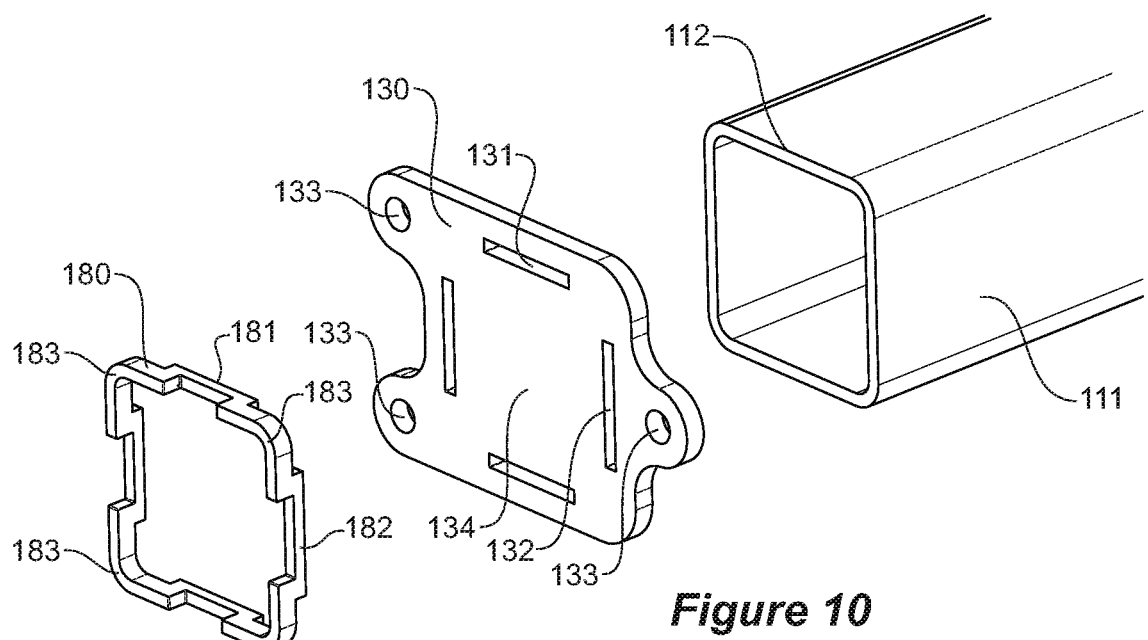
FIG. 10 is an exploded view of the end of the main bar of FIG. 9.

Referring now to FIGS. 9 and 10, where there is shown an end of a main bar 110 according to an alternative embodiment. While the end of the main bar 110 according to this embodiment appears substantially the same as the main bar 10 previously described, with features such as the bracket engaging portions 183 and the mounting holes 133 functioning generally in the same manner as the previous embodiment. There are however differences in the way this main bar 110 is manufactured, as described below.

The main bar 110 is a fully welded structure comprising a structural beam 111, a hitch receiver (not shown), and a pair of flange assemblies 130 located at each end of the beam.

Figures 11, 12:
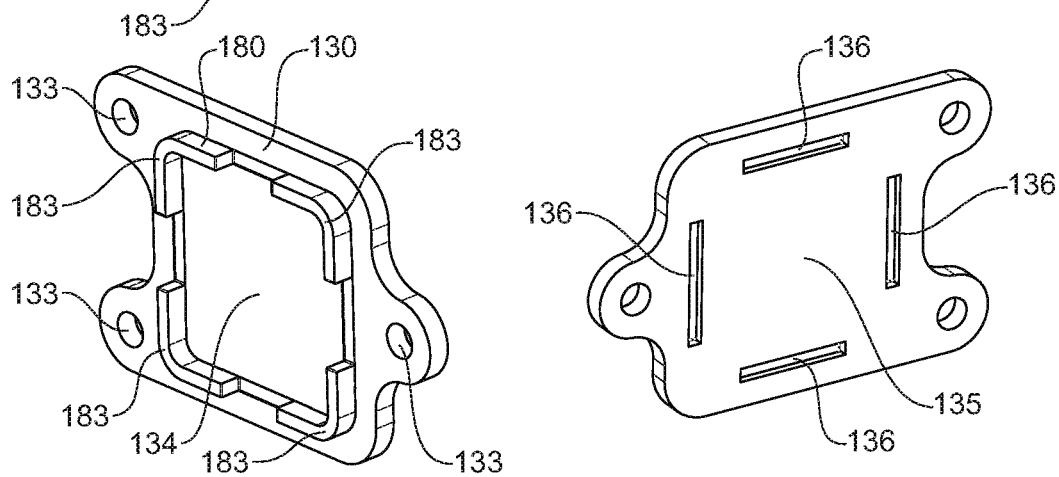
FIG. 11 is a front perspective view of the main bar flange assembly of the tow bar assembly of FIG. 9.
FIG. 12 is a rear perspective view of the main bar flange assembly of FIG. 11.

With reference to FIGS. 11 and 12, it can be seen that the flange assembly 130 comprises a flange plate 134 and projections 183 that extend beyond the flange plate 134 to form bracket engaging portions. The flange assembly 130 is then welded to the ends 112 of the beam 111.

It will be appreciated that in this embodiment, there are four bracket engaging portions 183 configured to engage with four complimentary shaped cut-outs formed in a corresponding bracket.

While the flange assembly 130 could be manufactured from a single piece of material using a machining process, the embodiment shown is manufactured from two parts being a flange plate 134 and a locking key 180 which are welded together to form the flange assembly 130. The flange plate 134 features four cut-outs 131, 132 configured to receive four flange engaging projections 181, 182 formed in the locking key 180. The locking key 180 also features four projections 183, that when assembled with the flange plate 134, extend beyond the flange plate 134 to form the four bracket engaging portions.

Referring to FIG. 12, it can be seen that when the flange engaging projections 181, 182 of the locking key 180 are inserted in to the flange plate 134, they do not extend all the way to the rear (beam facing) surface 135 of the flange plate 134, such that a recess 136 remains within which a weld bead (not shown) can be formed connecting the two components together.

It can be seen that the dimensions of the horizontal cut-outs 131 are different from the vertical cut-outs 132, and that the dimensions of the horizontal flange engaging projections 181 and the vertical flange engaging projections 182 are the same as the dimensions of the horizontal cut-outs 131 and vertical cut-outs 132 respectively. It will be appreciated that this ensures that the locking key 180 can only be inserted in to the flange plate 134 in the desired orientation.

The flange assembly 130 is then positioned at the end 112 of the structural beam 111 and a weld bead is formed between the rear surface 135 of the flange plate 134 and around the entire perimeter of the beam 111, connecting the two components together.

It will be appreciated that this embodiment of the main bar 110 provides an alternative resistance to water/dust ingress solution. Rather than relying on tight tolerancing between the flange and the beam, the main bar 110 instead relies upon welding of the recesses 136 formed between the locking key 180 and the flange plate 134, and welding the flange assembly 130 to the beam 111.

Throughout the specification and the claims that follow, unless the context requires otherwise, the words "comprise" and "include" and variations such as "comprising" and "including" will be understood to imply the inclusion of a stated integer or group of integers, but not the exclusion of any other integer or group of integers.

The reference to any prior art in this specification is not, and should not be taken as, an acknowledgement of any form of suggestion that such prior art forms part of the common general knowledge.

It will be appreciated by those skilled in the art that the invention is not restricted in its use to the particular application described. Neither is the present invention restricted in its preferred embodiment with regard to the particular elements and/or features described or depicted herein. It will be appreciated that the invention is not limited to the embodiment or embodiments disclosed, but is capable of numerous rearrangements, modifications and substitutions without departing from the scope of the invention as set forth and defined by the following claims.

What is claimed is:

1. A tow bar assembly for mounting to a vehicle, the tow bar assembly including:

a main beam configured to support a hitch receiver, the main beam comprising a plurality of spaced apart bracket engaging projections extending from each end of the main beam;

a pair of brackets configured to securely mount to the vehicle, each bracket including a plurality of corresponding beam engaging recesses, each configured to cooperatively interengage with a respective projection so as to locate and orient the bracket with respect to the main beam; and a pair of fasteners for securing respective brackets at or near respective ends of the main beam, wherein each bracket includes an internal portion located central to the plurality of recesses, such that that the plurality of recesses are spaced apart around the internal portion, such that when each bracket is secured to the main beam, the internal portion nests centrally within the plurality of spaced apart projections with the projections spaced apart around the internal portion.

2. The tow bar assembly of claim 1, further including a flange at or near each end of the main beam, and wherein each of the brackets are secured to the main beamvia the flanges.

3. The tow bar assembly of claim 1, wherein each fastener includes at least one nut and bolt pair.

4. The tow bar assembly of claim 1, wherein each bracket and its respective beam engaging recesses are configured to cooperatively interengage with their respective bracket engaging projections in one orientation only.

5. A tow bar assembly for mounting to a vehicle, the towbar assembly including:
- a main beam configured to support a hitch receiver, the main beam comprising a flange and a bracket engaging portion in the form of a plurality of spaced apart projections at each end;
- a pair of brackets configured to securely mount to the vehicle, each bracket including a beam engaging portion in the form of a plurality of corresponding recesses; and
- a pair of fasteners for securing respective brackets to a respective flange; wherein each bracket and its respective beam engaging recesses is configured to cooperatively locate over and interengage with a respective bracket engaging projection so as to locate and orient the bracket with respect to the main beam, wherein each bracket includes an internal portion located centrally between the plurality of recesses, such that the plurality of recesses are spaced apart around the internal portion, such that when each bracket is secured to the main beam, the internal portion nests centrally within the plurality of spaced apart projections with the projections spaced apart around the internal portion, and wherein each bracket is secured to the main beam via a respective flange.

* * * * *